(12) United States Patent
Smith et al.

(10) Patent No.: US 7,735,523 B2
(45) Date of Patent: Jun. 15, 2010

(54) SELF-EXTENDING ELECTRICAL HOSE

(75) Inventors: Stacy Smith, Simpsonville, SC (US);
Ken Campbell, Greenwood, SC (US)

(73) Assignee: Flexible Technologies, Inc., Abbeville, SC (US)

( * ) Notice: Subject to any disclaimer, the term of this patent is extended or adjusted under 35 U.S.C. 154(b) by 0 days.

(21) Appl. No.: 12/287,888

(22) Filed: Oct. 14, 2008

(65) Prior Publication Data

US 2010/0089479 A1    Apr. 15, 2010

(51) Int. Cl.
*F16L 11/00* (2006.01)
*F16L 11/12* (2006.01)

(52) U.S. Cl. .................. 138/118; 138/121; 138/122; 138/140; 138/127; 174/47

(58) Field of Classification Search ............. 138/122, 138/118, 103, 121, 137, 140; 174/47
See application file for complete search history.

(56) References Cited

U.S. PATENT DOCUMENTS

| | | | | |
|---|---|---|---|---|
| 3,861,424 A * | 1/1975 | Mizutani et al. | ............ | 138/119 |
| 4,186,778 A * | 2/1980 | Carey | ............ | 138/103 |
| 4,224,463 A * | 9/1980 | Koerber et al. | ............ | 174/47 |
| 4,354,051 A * | 10/1982 | Kutnyak | ............ | 174/47 |
| 4,693,324 A * | 9/1987 | Choiniere et al. | ............ | 174/47 |
| 5,416,270 A * | 5/1995 | Kanao | ............ | 174/47 |
| 5,555,915 A * | 9/1996 | Kanao | ............ | 138/133 |
| 5,601,119 A * | 2/1997 | Kanao | ............ | 138/133 |
| 6,024,132 A * | 2/2000 | Fujimoto | ............ | 138/122 |
| 7,156,127 B2 * | 1/2007 | Moulton et al. | ............ | 138/122 |
| 7,520,302 B2 * | 4/2009 | Smith | ............ | 138/118 |
| 2003/0111126 A1 * | 6/2003 | Moulton et al. | ............ | 138/122 |

* cited by examiner

*Primary Examiner*—Patrick F Brinson
(74) *Attorney, Agent, or Firm*—Thomas A. O'Rourke; Bodner & O'Rourke, LLP

(57) ABSTRACT

A hose construction adapted for efficiently conveying fluids while extended, but capable of neatly contracting to a fraction of its extended length for storage or transportation, while integrally incorporating lines for electrical requirements. Storage may be within an outer hose and may be triggered via closure of a valve within a nozzle so that negative pressure causes contraction of the folds of the hose. The contracted hose has a length that is a fraction of its normal extended length. The hose construction incorporates a wire reinforcing member which may bias the hose for self-extension and may also function as part of the electrical system. The electrical lines may comprise stranded copper wires to conduct power and/or serve as a remote activation circuit. The hose configuration may have a cover with external folds, which maximizes flow and provides a cushioning outer diameter to prevent damage to the hose.

48 Claims, 8 Drawing Sheets

SELF-EXTENDING ELECTRICAL HOSE

FIELD OF THE INVENTION

This invention relates generally to flexible hose construction, and more particularly to a multi-wire electrical stretch hose construction capable of self-extension upon removal of negative pressures.

BACKGROUND OF THE INVENTION

Flexible hoses have been utilized in many different applications involving transporting gases, liquids, and even solids, which are often in the form of particulate matter. Although most hose applications involve pumping material under pressure from a first location to second location, flexible hoses are frequently utilized in conjunction with electrical motors that create suction or negative pressure to create a vacuum.

Vacuum hoses have numerous applications, such as the intake vacuum to supply air into the manifold of a combustion engine, the pump and filter of a swimming pool's water cleaning system, industrial uses for materials processing or manufacturing as in the production of composite parts that are vacuum bagged and cured in an autoclave, or in scientific laboratories where a vacuum is necessary for experimentation.

Perhaps the most common application for a vacuum hose is its use in conjunction with the ordinary household vacuum cleaner. The home vacuum cleaner may be the most common usage of flexible vacuum hoses or perhaps may simply be the first application that comes to mind, but such vacuum cleaner usage may also be found in many commercial areas. Industrial vacuums are common in building construction for clean up after cutting operations or for water removal, and vacuums are even commonly truck-mounted to provide large scale, mobile vacuum capabilities with wide-ranging possibilities including sewage removal from cesspools to removal of litter, leaves, or pine needles from a golf course fairway.

In the home vacuum application, and particularly for industrial vacuum applications, the hose may need to be of substantial length during the cleaning operation to be practical or efficiently utilized. However, a substantial length of hose attached to a vacuum canister unit, or to another body which supports a vacuum motor, becomes cumbersome to handle and transport after vacuum operations have been completed. Moreover, during such operations when a portable vacuum unit merely needs to be relocated to another area requiring its use, the length of hose may be unwieldy and difficult to handle because of its bulk, and may hamper or degrade the overall efficiency of the cleaning operation.

These considerations have led to the development of stretch hoses, which provide greater convenience in the transporting and maneuvering of vacuum cleaners and hoses. While a stretch hose may simply be a hose whose construction permits a user to apply a force, which may be minimal, to increase the nominal working length of the hose, self-extending hoses are biased to extend to a greater working length without any effort on the part of the user, other than perhaps releasing a restraining mechanism that retains the hose in the retracted condition.

One example of a self-extending hose is shown by U.S. Pat. No. 6,948,527 to Ragner. Ragner discloses a hose design which has a biasing spring that exerts an extending force on the cover material, and through the use of a pressure control mechanism, can utilize suction to retract the hose against the spring biasing. Ragner suggests the possibility of incorporating conductors to supply electrical power to the end of the hose, but defers offering a solution or configuration for such conductors.

But U.S. Pat. No. 5,555,915 to Kanao offers a hose design whose construction incorporates a steel reinforcing wire as well as a conductive wire that is obtained by intertwisting a large number of copper fine wires. Kanao suggests a configuration whereby the reinforcing wire and conductive wire are side-by-side, with the hose cover material draping across the wire-pair and having inward folds which permit expansion. Kanao suggests that its construction provides extension/contraction zones that can be extended in the direction of the hose axis by manually pulling the hose, and that its use will result in "little user fatigue." Thus, the hose is not actually capable of self-extension. The invention discloses herein provides a hose capable of self-extending while incorporating multiple wires capable of providing necessary electrical connections at the user's end of the hose.

SUMMARY OF THE INVENTION

The self-extending flexible hose of this invention has many specialty applications, one of which may be for the storable hose arrangement of a vacuum cleaning system. In such a system, which will be described merely to exemplify the utility of this hose construction, the self-extending hose may be of a generous length so as to permit the user a large amount of freedom to maneuver while conducting cleaning operations. Such a long length of hose, while useful during vacuum operations would necessarily become cumbersome and bulky after operations ceased, when it must be either stored or transported to another work location.

The self-extending hose of this invention not only permits retraction and subsequent extension, because of its construction, but it also integrally incorporates electrically conductive lines, which may provide electrical service to the user end of the vacuum system. The electrical service may be necessary to power ancillary functions related to the suction transmitted by the hose. Some common ancillary functions may arise from inclusion of a power head attached to the end of the hose, where the power head may have an independent motor to drive a beater bar or a brush roller. The electric lines may also be used to simply power a light.

To create a storable hose arrangement, the self-extending hose of this invention is designed so as to be biased to its normal length when not otherwise restrained. However, the biasing may not be excessive, as this particular application utilizes vacuum pressure, once flow into the end of the vacuum hose has been blocked, preferably by a flow control valve, to retract the self-extending hose into a more manageable length. In this application, a secondary outer hose or constraining hose is included so as to be generally concentric to the self-extending hose, while only being a fraction of its length. The constraining hose may be in the range of about ten percent to about seventy percent of the length of the self-extending hose, but typically is roughly thirty percent of the length of the self-extending hose. Once the user has completed a vacuum operation in an area; and seeks to move to a new location or to cease operations completely, the user, while the negative vacuum pressure is still present within the self-extending hose, may close the valve so that the negative pressure creates a force which causes retraction of the self-extending hose at its folds. Retraction of the hose may be completed once a feature of the hose's nozzle co-acts with a cuff on the constraining hose to mechanically restrain the self-extending hose, after which vacuum pressure may be terminated.

The construction of the hose disclosed herein is capable of neat retraction into the outer constraining hose, while incorporating multiple conducting wires to supply the electrical demands at the user end of the self-extending hose. This construction comprises a wire reinforcing member, preferably a steel wire, which is wound through a series of turns to preferably produce a helical shape not unlike that of a compression spring. The turns of the reinforcing member, as well as the interstitial space between the turns, receives a series of plies of thermoplastic material to create a flexible cover. The plies are formed so as to have an outward fold between the turns while the self-extending hose is in the unrestrained condition. The outward folding maximizes the inner diameter of the hose for a given construction, and accommodates the retraction of the self-extending hose.

Disposed in the plies of thermoplastic material so as not to inhibit the retraction capability of the self-extending hose, may be the plurality of conducting lines in the form of stranded copper wire. Each of the stranded copper wires may be similarly formed into a series of helical turns so as to be located between the fold and the wire reinforcing member, but in close proximity to and only on one side of the wire reinforcing member. This positioning of the stranded copper wire in proximity to the wire reinforcing member and to the fold permits retraction of the self-extending hose at the folds, with resistance principally due to the wire reinforcing member. The wire reinforcing member may thus be designed so as to possess a spring rate which may bias the hose to its normal extended position once the valve has been opened, but a rate that is not so great as to prevent the system's vacuum pressure from overcoming the biasing to retract the self-extending hose into the constraining hose, with closure of the flow control valve. The plurality of wires may comprise two copper wires which conduct line voltage, a third wire which can serve as a second lead for a remote unit activation circuit, and a fourth wire reinforcing member which serves as the first lead.

OBJECTS OF THE INVENTION

It is an object of this invention to provide a hose which is capable of transmitting suction loads from one end to another end.

It is further object of this invention to provide a hose which may be flexibly utilized to transmit fluids.

It is another object of this invention to provide a construction for a hose that is light weight.

It is another object of this invention to provide a hose that is capable of contracting into a more compact form when not in use.

It is another object of this invention to provide a hose which contracts when vacuum pressure is utilized to overcome biasing of a reinforcing member.

It is another object of this invention to provide a hose capable of self-extension from a compact form once a restraining force is released.

It is another object of this invention to provide a wire reinforcing member which serves as an electrical lead.

It is another object of this invention to incorporate conducting wires into a self-extending hose.

It is another object of this invention to provide a self-extending hose whose construction provides for outward folding of the cover material.

DETAILED DESCRIPTION OF THE PREFERRED EMBODIMENT

Figure 1:
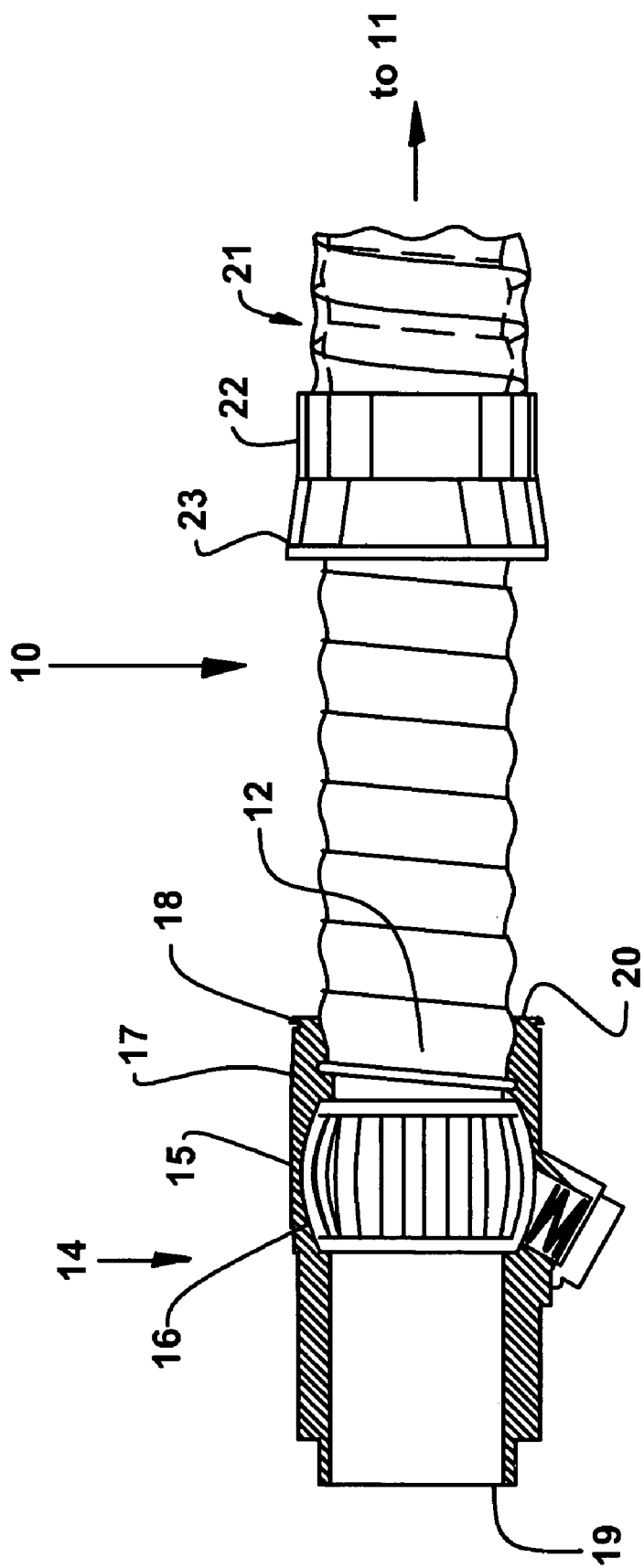
FIG. 1 is a side view of the flexible hose of this invention shown in the extended condition, and is being utilized in conjunction with a negative pressure source, an outer constraining hose, and a nozzle with a flow control valve.

A section of a self-extending hose 10 according to the invention is shown in FIG. 1 as it is incorporated into a vacuum system. The particular vacuum system of FIG. 1 in which the hose 10 is incorporated does not in any way limit usage of the hose of this invention, and is merely meant to provide one example of its possible use.

In the vacuum system of FIG. 1, a first end 11 of the self extending hose 10 is connected to a source of negative pressure (not shown), while the other end is connected to a nozzle assembly 14. The self-extending hose 10 is generally surrounded, in this exemplary embodiment, by a constraining hose 21, which has a slightly larger diameter. The constraining hose 21 terminates in a cuff 22 that has a flared end 23. The self-extending hose 10 may normally extend a substantial distance beyond the cuff 22 of constraining hose 21. The constraining hose 21 may generally be flexible, but is preferably not a stretch hose.

The nozzle assembly 14 may have a cylindrical casing 15 with a first end 19 that is open, and a second end 20 which may have a fitting in the form of a lip 18. Although first end 19 is shown in FIG. 1 with a simple cylindrical opening, it may also terminate in a vacuum head containing beater bars or a brush roller that is driven by a separate motor. The vacuum head of an alternative embodiment may also incorporate a light. The electrical requirements of these elements may be supplied by an external electrical cord that may be attached to the hose, but in the example shown which incorporates this invention, as is described in later paragraphs, the electrical requirements may be supplied by conducting wire that is integrally incorporated into the self-extending hose 10.

Protruding inward and then extending generally concentric to the cylindrical casing 15 at the second end 20 of nozzle assembly 14 may be a fitting or connector 17. The connector 17 is of a diameter and configuration to permit mounting of the second end 12 of self-extending electrical hose 10. The hose 10 may be fixed to the connector using a conventional clamp or other means commonly used in the art. With second end 12 of hose 10 attached to the connector 17 of nozzle assembly 14, negative pressure generated at the source (not shown) is transmitted through self extending electrical hose 10 and through the nozzle assembly 10 to its open end 19. The open end 19 of the nozzle assembly 14 may thus be utilized as needed in the desired vacuum operation, as the negative pressures would induce fluid flow, in this case air, to create suction forces that may draw particulate matter or other solids into the nozzle assembly 14 and through the hose 10.

Interposed between the open end 19 of nozzle assembly 14 and the nozzle's connector 17, may be a flow control valve 16. Flow control valve 16 may be incorporated to restrict or limit the intake of fluid entering the hose 10. Additionally, flow control valve 16 may contribute to the control and operation of self-extending electrical hose 10 as follows.

As previously described, the self-extending electrical hose 10 may be of substantial length while in its normal, unrestrained condition. The length may be chosen so as to provide the user with a very generous freedom of movement to enable efficient vacuum operations. However, this substantial length, while extremely practical and productivity enhancing during vacuum operations, may conversely be impractical afterwards, as such a lengthy hose would need to be gathered and possibly coiled to facilitate its storage or movement to another area requiring vacuum operations. It should be apparent that the longer the hose length that is utilized, the greater the bulk that requires handling both before and after vacuum operations, which requires a correspondingly greater amount of time and effort. The self-extending electrical hose 10 disclosed herein alleviates the tradeoff of utilizing longer hose lengths, while providing increased functionality in other respects.

As previously stated, the self-extending electrical hose 10 may be disposed within outer constraining hose 21, which may be utilized for retraction and storage of the self-extending electrical hose 10. With the vacuum arrangement of FIG. 1, which includes a flow control valve 16, the user, upon completing vacuum operations, may command the flow control valve using a switch that is common in the art, to not just simply restrict air flow, but rather to completely block the flow while negative pressures are maintained in the hose 10. With the airflow blocked, the negative pressure in the hose, while it would not produce any noticeable affect on a rigid hose or pipe, would conversely have the effect of collapsing the self-extending electrical hose 10 at its folds. The hose 10 of this invention is particularly configured to include electrical wiring while still accommodating such hose contraction at its folds.

Figure 2:
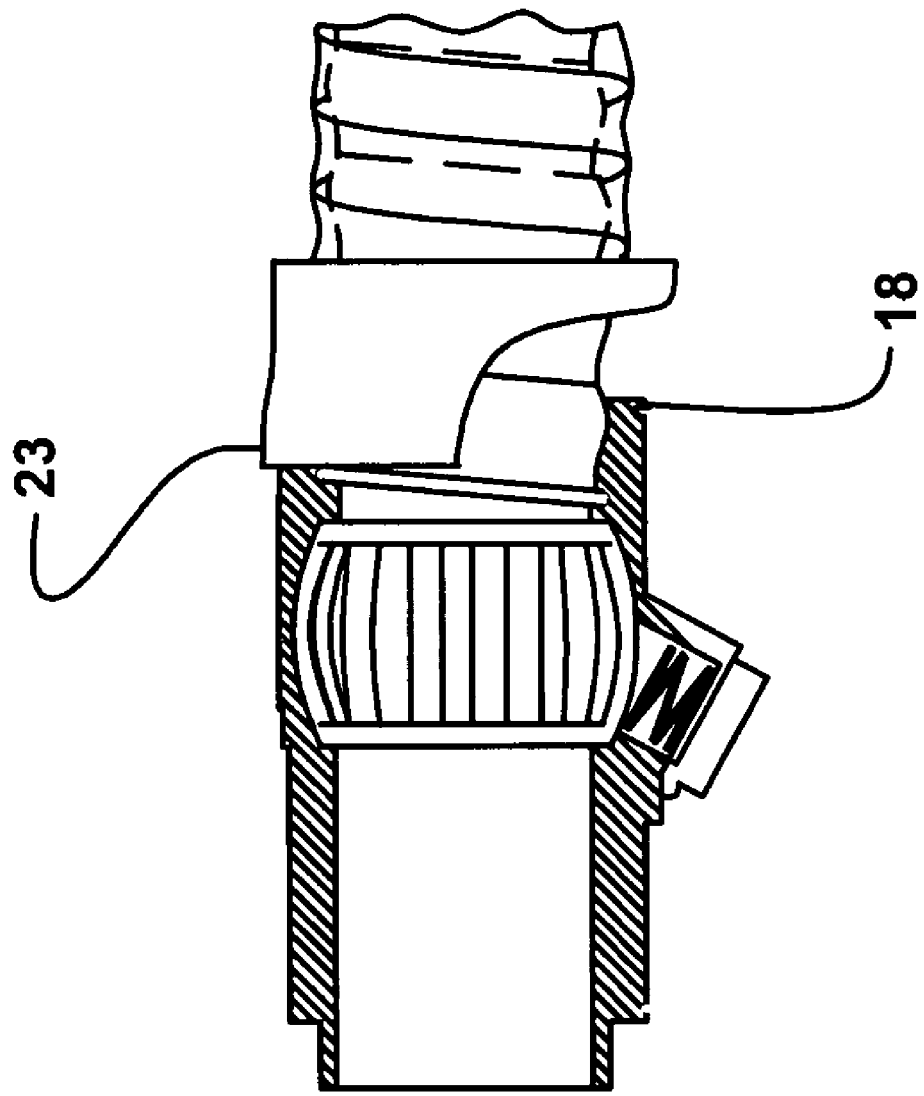
FIG. 2 is the side view of the flexible hose and arrangement of FIG. 1, but where the valve had been closed to permit vacuum pressure to retract the self-extending hose to be within the confines of the outer constraining hose.

The negative pressure would need to be maintained until the hose 10 had contracted sufficiently so as to draw the lip 18 of the nozzle assembly 14 within the flared portion 23 of cuff 22 of the constraining hose 21. The flared portion 23 of cuff 22 would contain complementary features to catch and hold the lip 18 of the nozzle assembly 14, and thus allow the self-extending hose 10 to be neatly gathered and held within outer constraining hose 21, as shown in FIG. 2. Outer constraining hose 21 would therefore need to be designed based on the diameter of the self-extending hose 10 and any increase in diameter created by any folds that might expand outwards during contraction. The self-extending hose 10 may be stored and retained within outer constraining hose 21 by way of the mechanical connection between the lip 18 of the nozzle assembly 14 and the cuff 22 of the constraining hose 21, and upon release of that mechanical connection by the user, biasing which is integral to the self-extending hose 10, permits hose 10 to return to it normal unrestrained length. Outer constraining hose 21 may itself be of a length that is only a fraction of that utilized for self-extending hose 10. The length of constraining hose 21 is preferably manufactured to be in the range of about ten percent to about seventy percent of the unconstrained length of self-extending hose 10, and is more preferably between twenty percent and fifty percent of its length, and is most preferably in the range of about twenty-five percent to about forty percent of the length of self-extending hose 10.

Figure 3:
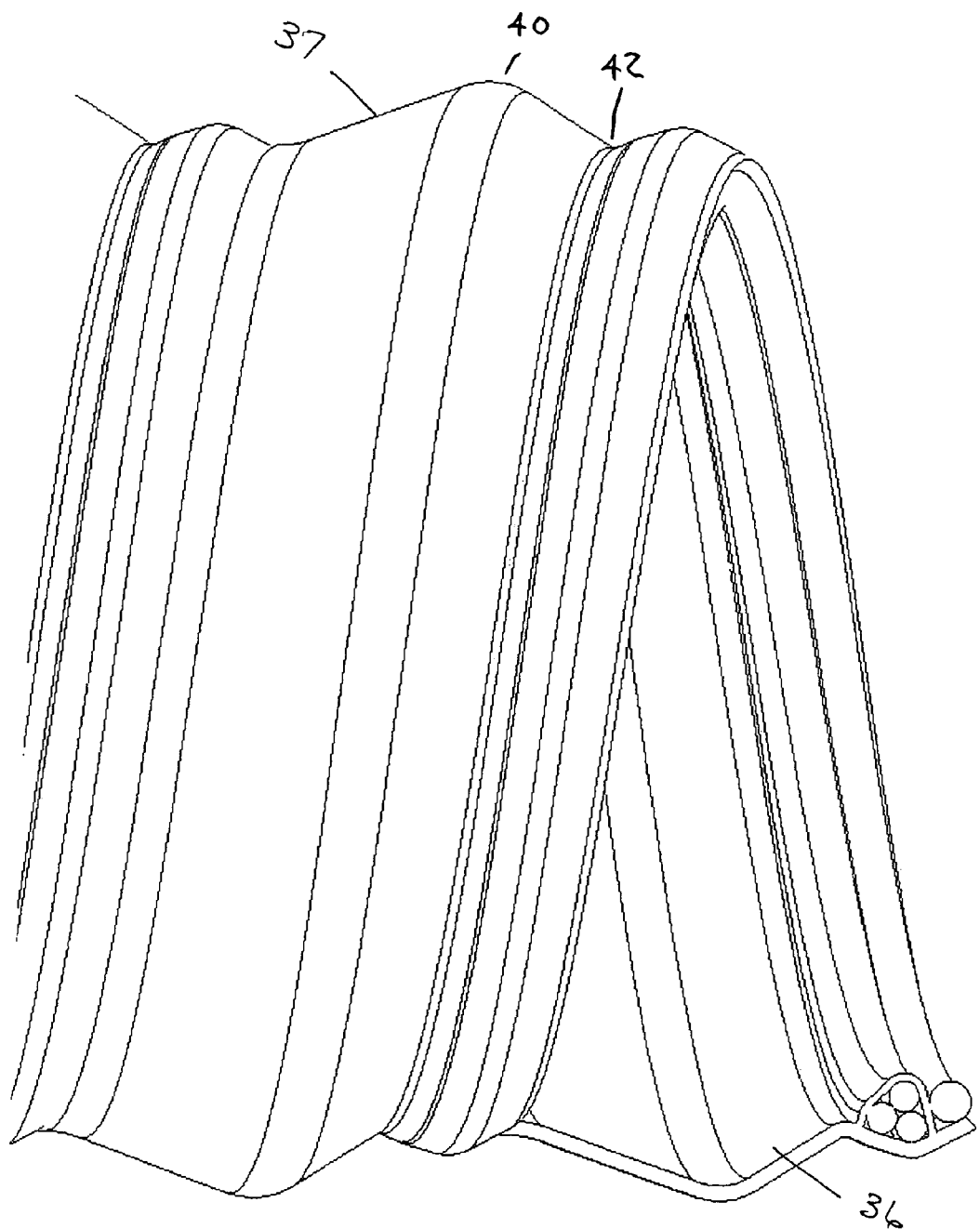
FIG. 3 is an enlarged view of a section of the self-extending hose of this invention.
Figure 4:
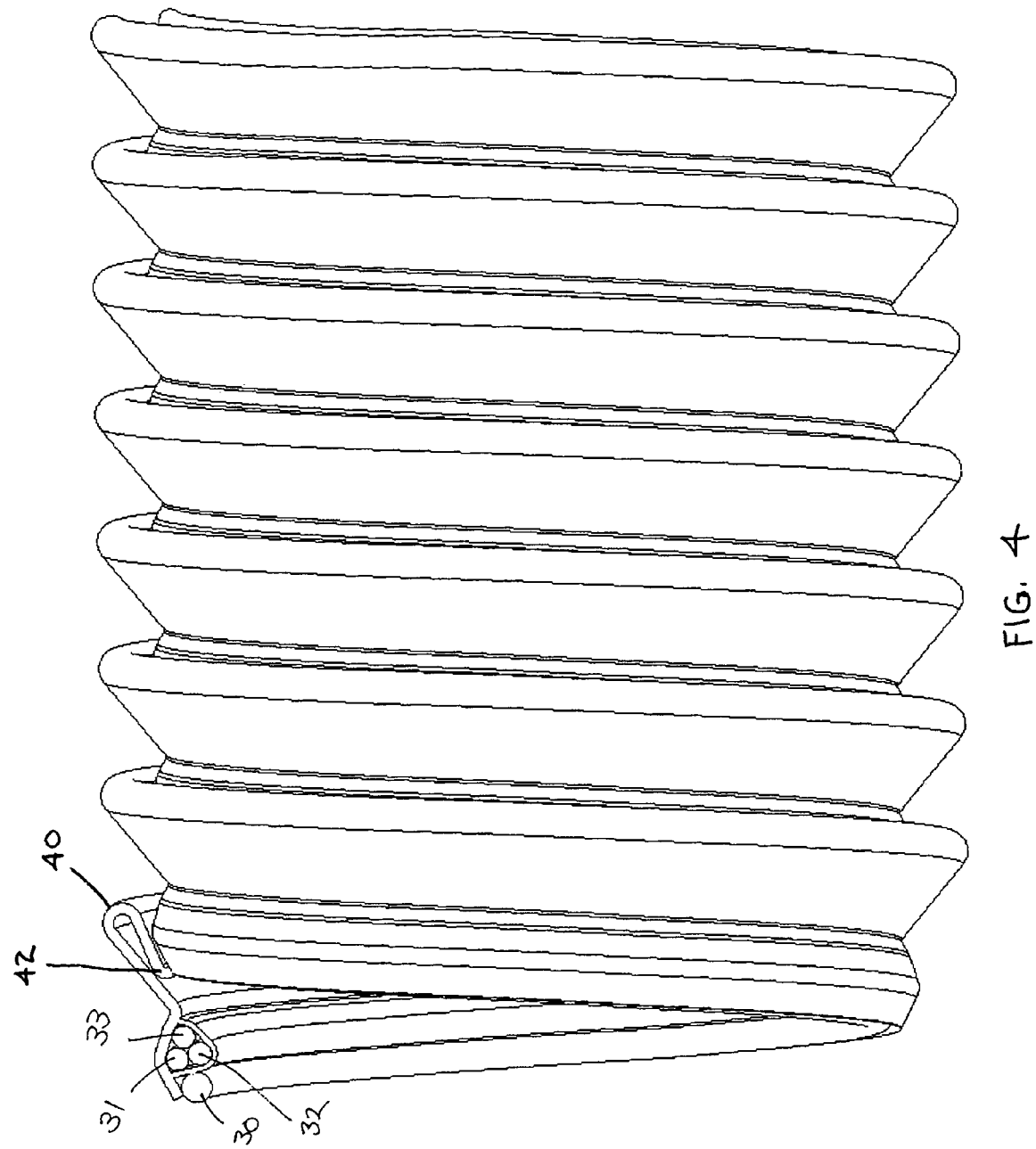
FIG. 4 is an enlarged view of a section of the self-extending hose of this invention in a compressed form with the wire reinforcing member and conducting wires exposed.
Figure 5:
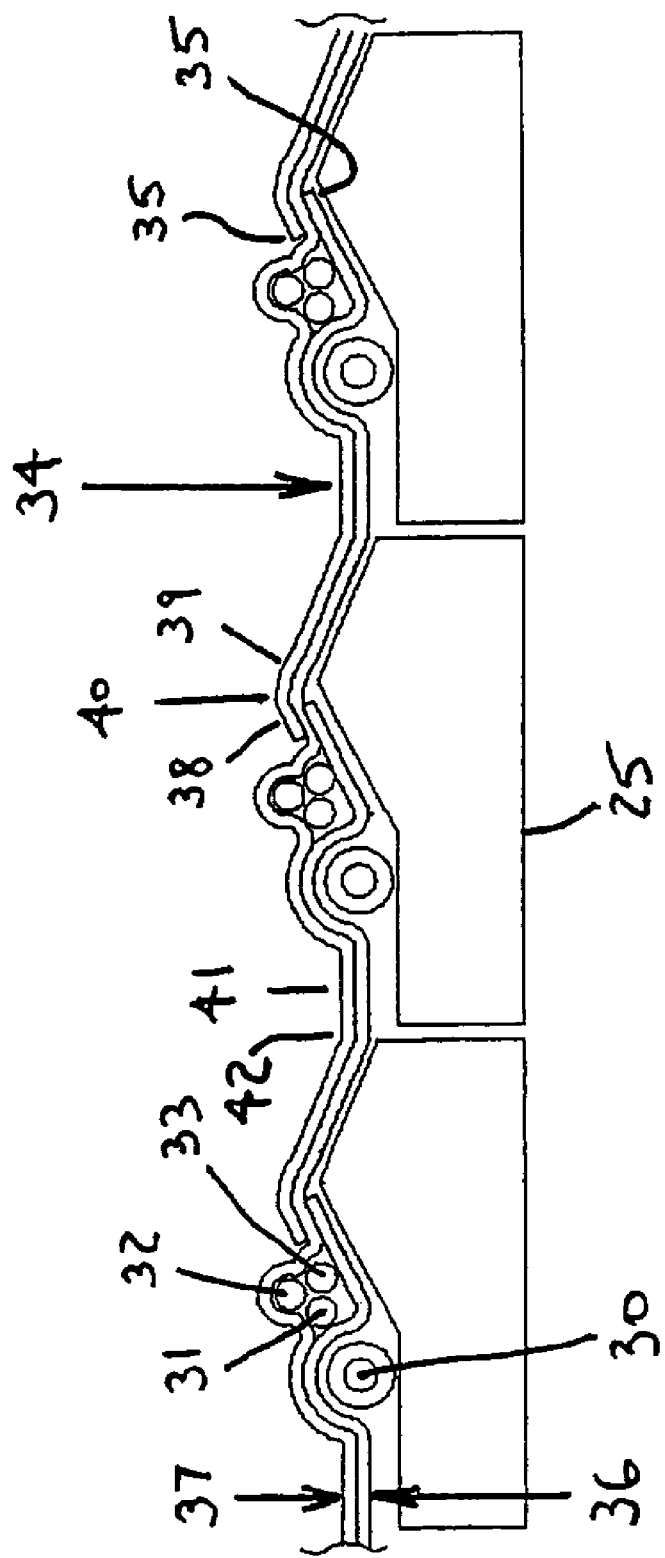
FIG. 5 is a cross-section showing build-up, on a mandrel, of the wire reinforcing member, the conductive wires, and plies constituting the flexible hose cover.
Figure 6:
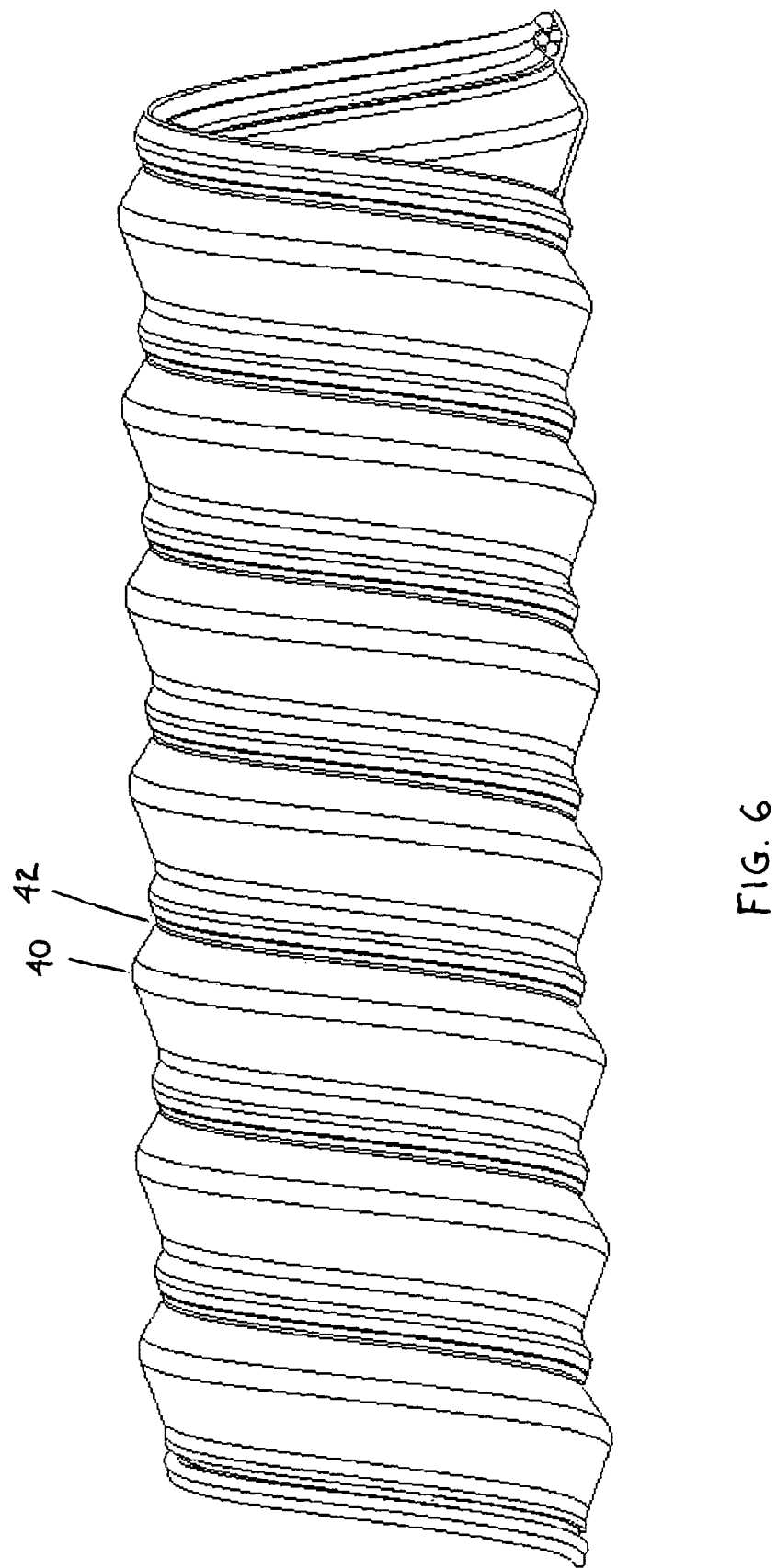
FIG. 6 is a view of the flexible hose of this invention shown in its normal or extended condition.
Figure 7:
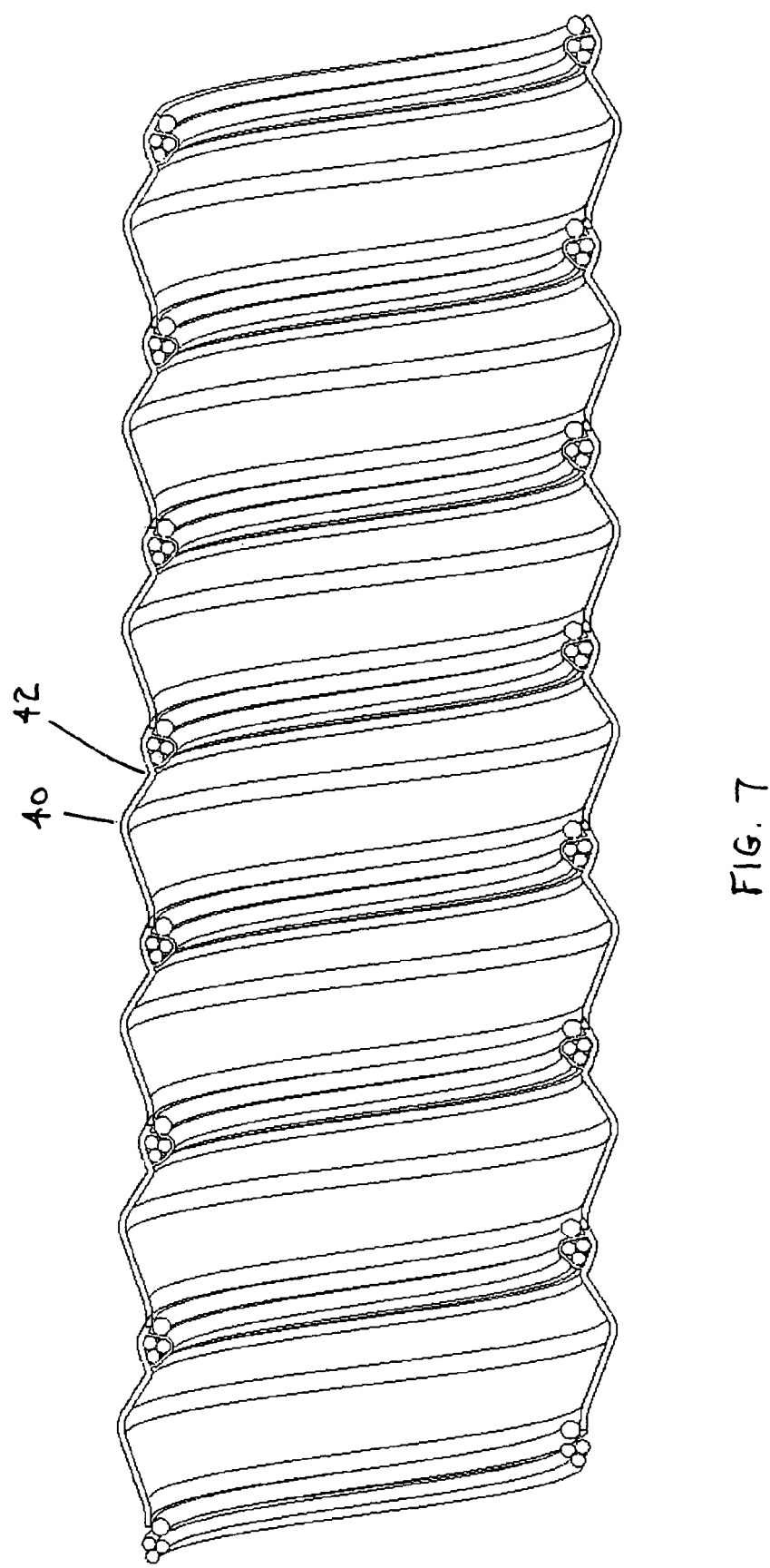
FIG. 7 is a cross sectional view of the flexible hose of FIG. 6
Figure 8:
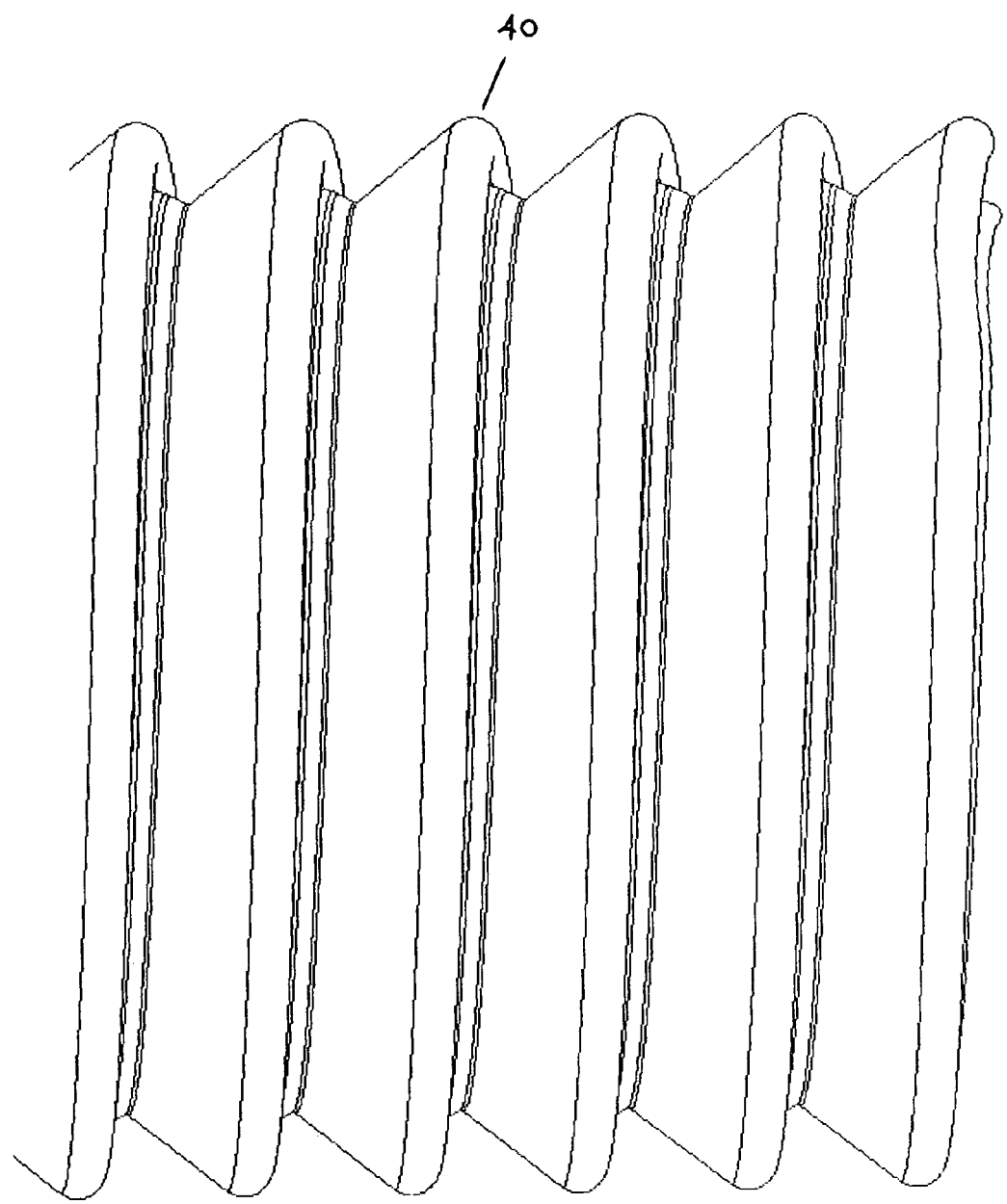
FIG. 8 is the flexible hose of the invention shown in a compressed or retracted condition.

The self-extending hose 10 is capable of the described contraction and self-extension while incorporating wiring to accommodate electrical requirements, by utilizing the construction which is shown schematically in FIG. 5, and is also shown in actual photos in FIGS. 3 and 4.

Biasing of self-extending hose 10 is accomplished by the wire reinforcing member 30, which is formed generally into a series of flexible turns about a longitudinal axis each having a spacing from an adjacent turn to create an interstitial area. The flexible turns of wire reinforcing member 30 are created during the manufacturing process by wrapping the wiring about a mandrel 25 as shown in FIG. 5. In order for the turns of the wire reinforcing member 30 to be flexible and possess the necessary spring rate to achieve proper biasing of the hose 10, it may be formed using an elastic material. Although other materials are also suitable, a high strength steel has very desirable qualities and is often used. The wire reinforcing member 30 also will generally have a constant pitch over the length of the hose, and a generally constant radius of curvature, although those parameters could be varied for a particular hose application. Maintaining a generally constant pitch and curvature will lend the wire reinforcing member 30 to have a helical shape, which may be wound in either direction to produce a left-handed or a right-handed helix.

The wire reinforcing member 30 may be a copper clad steel wire and may thus serve as a remote lead for remote unit activation or serve to both bias and support a flexible cover 34. Flexible cover 34 may be formed of layers or plies 35 of thermoplastic material, which generally overlays the wire reinforcement member 30 and the interstitial area between the turns (FIG. 5), and thus create a hose having an inner surface 36 for conveying the fluids, and an outer surface 37. One or more ply layers 35 may be located on the inside surface 36 so as to completely surround wire reinforcing member 30 with thermoplastic material. The plies 35 may comprise a series of continuous plies that run the entire length of the cover 34, or may comprise plies running for discrete portions of the length of the hose and have areas in which the plies overlap to form continuous surfaces 35 and 36 of cover 34. The cover 34 material should naturally be impermeable to the fluids the hose 10 must convey. In the case of the vacuum system of FIG. 1, the cover 34 must serve simply as an air conduit.

To facilitate the contraction of hose 10, the cover 34 may be formed so as to have a fold composed of a first side 38 and a second side 39 such that the first side 38 may angle from the region of the wire reinforcing member away from the longitudinal axis of the helix. The first side 38 may reach an apex 40 and may be connected to second side 39 which angles back down toward the longitudinal axis of the helix and may terminate at a point 42 upon reaching a relatively short flattened cross-sectional area 41. The flat area 41 of the cross-section may essentially create a valley between the second side 30 and the successive turn of the wire reinforcing member 30. Having the folds of the cover 34 formed so as to be outward folded serves to maximize the inner diameter of the hose for a given construction. Also, the outwards folds of cover 34 may serve to provide a cushioning surface which may prevent damage or marring to the hose 10, particularly as it is dragged along a surface during vacuum operations, and when it is drawn into the outer constraining hose 21 and may contact the constraining hose 21. As the hose 10 is retracted into outer constraining hose 21 by closing the flow control valve 16, while negative pressure maintained in the system, the first side 38 and second side 39 of the folds may generally move towards each other with the apex 40 expanding outward and away from the longitudinal axis. As the sides 38 and 39 of the fold expand outwards and generally towards each other during retraction, the inner surface 36 of cover 34 around the wire reinforcing member 30 may generally maintain a constant diameter.

Electrical requirements of a particular vacuum system, possibly the separate motor for the beater bars or brush roller, or the light, may be facilitated by incorporation of a plurality of electrically conductive lines to conduct line voltage. In a preferred embodiment of the invention, shown in the schematic of FIG. 5, three conducting wires—31, 32, and 33, are disposed between the thermoplastic plies 35 and are formed into a series flexible turns so as to be disposed adjacent to and generally parallel to the turns of wire-reinforcing member 30. The flexible nature of the self-extending electrical hose 10—in terms of contraction and expansion of its folds—is created by having the plurality of conductive lines 31, 32, and 33, being disposed to one side of the wire reinforcing member 30. The conducting lines 31, 32, and 33, so as to possess adequate electrical conductivity, may be comprised of copper wire, which typically has gauges in the range of about 10 to about 30. The copper wire may also possess its own individual thermoplastic jacket to serve as insulation.

The conducting lines 31, 32, and 33 may also be in the form of stranded copper wire so as to not create a spring rate that is excessively high when combined with that of wire reinforcing member 30. The spring rate of the self-extending hose 10 may be designed so as to permit the hose 10 to extend from the outer constraining hose 21 once the mechanical connection between cuff 22 and nozzle assembly 14 has been released, and upon removal of the negative pressure and the opening of the flow control valve 16. The spring rate, while being large enough so as to accomplish biasing to the extended position, must not be excessive, as the negative vacuum pressure generated in the hose 10 must produce a retraction force large enough to overcome the biasing to permit retraction and coupling of the nozzle 14 to the cuff 22. Design of the wire reinforcement member 30 of self-extending hose 10, in regard to biasing capability, will also take into account the resistance due to the thickness of the thermoplastic ply layers used, and may be adjusted through the mean diameter of the helix, which may in fact need to be set based on the vacuum pressure expected and the desired fluid flow rate flow. The biasing capability may also be adjusted for a given hose through selection of an appropriate cross-sectional diameter of the wire, and the number of turns or coils per unit length of the wire reinforcing member 30.

While two of the stranded copper wires may be used for conducting line voltage, the third wire may be utilized as a second lead for remote unit activation. Furthermore, hose construction as shown by this invention is not limited to the three conducting wires 31, 32, and 33 as shown in a preferred embodiment, and may include larger numbers of such wires. Two wires may be used in alternative embodiments, however the invention would only have remote activation functionality. Also, this construction for self-extending hose 10 permits incorporation, either along with or in place of the plurality of lines, of a fiber optic bundle for continuous signal conducting.

Other modifications, substitutions, omissions and changes may be made in the design, size, materials used or proportions, operating conditions, assembly sequence, or arrangement or positioning of elements and members of the preferred embodiment without departing from the spirit of this invention as described in the following claims.

We claim:

1. A self-extending flexible hose, for use in applications requiring a conduit to convey fluids or certain solids using negative pressure or suction, said hose comprising:
   (a) a reinforcement member, said reinforcement member being formed generally into a series of flexible turns about a longitudinal axis each with a spacing from an adjacent one of said series of flexible turns to create an interstitial area;
   (b) a cover, said cover being formed of layers of thermoplastic material, said thermoplastic layers being formed to overlay said interstitial area between said turns and at least a portion of said reinforcement member, said thermoplastic material forming an inner surface and an outer surface; said inner surface and said outer surface of said cover in the region of said interstitial area being formed to have a fold with first and second sides, said first side contacting said second side of said fold at an angle and forming an apex, said fold extending outward and away from said longitudinal axis of said reinforcing member, said cover having a first end and a second end, said cover being generally impermeable to fluids; and
   (c) a plurality of lines, said plurality of lines disposed between said layers of thermoplastic material, said plurality of lines also being formed into a series of flexible turns so as to be disposed adjacent to said reinforcing member and separated therefrom by one or more of said layers of said cover, said plurality of lines being disposed to one side of said reinforcing member.

2. A flexible hose according to claim 1 wherein said flexible turns of said reinforcing member are formed using an elastic material, said turns of said reinforcing member having a spring rate capable of biasing said hose cover.

3. A flexible hose according to claim 2 wherein said spring rate of said reinforcing member permits retraction of said hose upon application of negative pressure at said first end of said hose while said second end of said hose is blocked.

4. A flexible hose according to claim 3 wherein said thermoplastic material of said fold expands outward when said hose retracts.

5. A flexible hose according to claim 4 wherein said inner surface of said cover maintains a generally constant diameter during said hose retraction.

6. A flexible hose according to claim 4 wherein said first and second sides of said folds contact each other in a retracted position to provide cushioning to prevent damage to said cover.

7. A flexible hose according to claim 4 wherein said spring rate of said reinforcing member permits said hose to self-extend from said retracted position upon removal of said negative pressure from said first end of said hose.

8. A flexible hose according to claim 4 wherein said spring rate of said reinforcing member is such that said hose self-extends from a retracted position upon unblocking of said second end of said hose.

9. A flexible hose according to claim 2 wherein said plurality of lines are comprised of electrically conductive wire, said electrically conductive wire being insulated by a thermoplastic jacket.

10. A flexible hose according to claim 9 wherein said electrically conductive wire is comprised of stranded copper wire.

11. A flexible hose according to claim 10 wherein said stranded copper wire has a gauge is in the range of about 10 to about 30.

12. A flexible hose according to claim 11 wherein said copper conducting wire is utilized for line voltage.

13. A flexible hose according to claim 11 wherein said copper conducting wire is utilized as a second lead for remote unit activation.

14. A flexible hose according to claim 2 wherein at least one of said plurality of lines comprises a fiber optic bundle.

15. A flexible hose according to claim 2 wherein said series of flexible turns of said reinforcing member have a constant pitch over the length of said hose.

16. A flexible hose according to claim 15 wherein said reinforcing member is steel wire.

17. A flexible hose according to claim 16 wherein said steel wire is a copper-clad.

18. A flexible hose according to claim 17 wherein said copper-clad steel wire is used as a lead for remote unit activation.

19. A flexible hose according to claim 1 wherein said turns of said reinforcement member generally form a helical shape.

20. A flexible hose according to claim 19 wherein said helix is from the group consisting of a left-handed helix and a right-handed helix.

21. A flexible hose according to claim 1 wherein said layers of said cover are in the range of about 10 mil thick to about 50 mil thick.

22. A flexible hose according to claim 8 wherein said blocking and unblocking of said second end is by a valve.

23. A flexible hose according to claim 22 wherein said retraction of said hose is into a constraining hose, and wherein said constraining hose has a diameter greater than said folds of said retracted flexible hose.

24. A flexible hose according to claim 23 wherein said constraining hose has a length in a range of about ten percent to about seventy percent of said length of said self-extending hose.

25. A flexible hose comprising:
 (a) a reinforcement member, said reinforcement member being formed into a series of turns about an axis with each being spaced from an adjacent one of said series of turns to create an interstitial area;
 (b) a cover, said cover being formed of a plurality of plies with one or more plies being positioned to overlay at least a portion of said interstitial area and at least a portion of said reinforcement member; said cover and said reinforcement member creating a nominal length of said hose having a first end and a second end and having an inner surface and an outer surface; said cover at said interstitial area being formed to have a flat portion extending laterally from said reinforcement member and transitioning into a first side of a fold, said first side connecting at an angle to a second side of said fold at an apex, said fold extending away from said axis to form an outward fold;
 (c) one or more lines, said one or more lines being formed into a series of flexible turns adjacent to one side of said reinforcing member but separated therefrom by one or more of said plies of said cover; and
 (d) said turns of said covered reinforcement member thereafter being elastically deformable relative to said formation axis.

26. A flexible hose according to claim 25 wherein a compressive force causes said hose to retract by overcoming a spring rate of said series of turns of said reinforcement member; and wherein said retraced hose length is less than said nominal length.

27. A flexible hose according to claim 26 wherein said retraction of said hose is by said first side and said second side of said fold moving toward each other to reduce said angle.

28. A flexible hose according to claim 27 wherein retraction further comprises said transition point moving from an initial position on one side of said apex to a second side of said apex.

29. A flexible hose according to claim 28 wherein said compressive force comprises application of negative pressure at said first end of said hose while said second end of said hose is blocked.

30. A flexible hose according to claim 29 wherein said spring rate biases said hose to said nominal length when said first end of said hose is unblocked.

31. A flexible hose according to claim 30 wherein said blocking and unblocking of said second end is by a valve.

32. A flexible hose according to claim 31 wherein said retraction of said flexible hose is into a constraining hose, said constraining hose having a length in a range of about ten percent to about seventy percent of said nominal length of said flexible hose.

33. A flexible hose according to claim 32 wherein said apex comprises a curved surface.

34. A flexible hose according to claim 25 wherein a tensile force causes said hose to extend by overcoming a spring rate of said series of turns of said reinforcement member; and wherein said extended hose length is greater than said nominal length.

35. A flexible hose according to claim 34 wherein said spring rate biases said hose to said nominal length when said tensile force is removed.

36. A flexible hose according to claim 25 wherein said one or more lines are comprised of conducting wire.

37. A flexible hose according to claim 36 wherein said conducting wire is comprised of stranded copper wire.

38. A flexible hose according to claim 37 wherein said reinforcement member comprises copper-clad steel wire.

39. A flexible hose according to claim 38 wherein said plies of said cover are comprised of thermoplastic material.

40. A flexible hose according to claim 39 wherein said thermoplastic material is generally impermeable to fluids.

41. A flexible hose according to claim 25 wherein said outward fold provides a cushioned surface to prevent damage to objects during use of said hose.

42. A flexible hose according to claim 25 wherein at least one of said one or more lines comprises a fiber optic bundle.

43. A flexible hose comprising:
 (a) a reinforcement member, said reinforcement member being formed into a series of turns with each being spaced from an adjacent one of said series of turns;
 (b) a cover, said cover being formed of a plurality of plies with one or more plies being positioned to overlay at least a portion of said spacing and at least a portion of said reinforcement member; said cover having an inner surface and an outer surface; said cover at said spacing between said series of turns being formed to have a fold, said fold comprising a first side and a second side, said second side being longer than said first side, said fold extending away from said inner surface;
 (c) one or more lines, said one or more lines being formed into a series of flexible turns and disposed adjacent to said reinforcing member but separated therefrom by one or more of said plies of said cover, said one or more lines being disposed in said second side of said fold; and (d) said turns of said covered reinforcement member thereafter being elastically deformable.

44. A flexible hose according to claim 43 wherein a compressive force causes said hose to retract, and wherein said retraction comprises said first side and said second side moving toward each other.

45. A flexible hose according to claim 44 wherein said retraction further comprises said second side causing said first side to rotate so as to face an opposite direction of said hose.

46. A flexible hose according to claim 45 wherein at least one of said one or more lines comprises electrically conductive wire.

47. A flexible hose according to claim 46 wherein said electrically conducting wire comprises stranded copper wire, said stranded copper wire being insulated by a thermoplastic jacket.

48. A flexible hose according to claim 45 wherein at least one of said one or more lines comprises a fiber optic bundle.

* * * * *